3,084,182
BLOCKED ISOCYANATES FROM STILL RESIDUES
Wilbur R. McElroy, Hillside, W. Va., assignor to Mobay Chemical Company, Pittsburgh, Pa., a corporation of Delaware
No Drawing. Filed May 9, 1960, Ser. No. 27,509
5 Claims. (Cl. 260—471)

This invention relates to blocked isocyanates and to a method of preparing the same. More particularly, it relates to blocked isocyanates useful in the preparation of coatings, wire enamels, caulking compounds and the like.

It is known to produce organic polyisocyanates by reacting the corresponding polyamines with phosgene in an organic solvent such as chlorobenzene or o-dichlorobenzene. This reaction can be carried out either continuously or discontinuously, but in either case it contemplates first the treatment of the polyamine at approximately 0° C. with phosgene in a mixing apparatus and then a treatment with a further excess of phosgene at higher temperatures with continued stirring. The excess of phosgene is then removed by a stream of inert gas such as nitrogen or carbon dioxide.

A process for continuously producing organic polyisocyanates is illustrated in Canadian Patent 537,484. This process is preferred because of the high throughput rate and the high yields obtained.

In either process, that is, either the continuous or discontinuous process, the resulting isocyanate produced in the hot-phase step of the reaction is generally vacuum-distilled to improve the purity of the particular isocyanate. This distillation procedure also produced an undistillable residue which can amount to from about 5% to about 30% of the diamine introduced depending upon the nature of the starting materials and the phosgenation process. The chemical composition of these residues is not clear. However, it has been postulated that these residues known and referred to in the art as "still bottoms" contain urea compounds of high molecular weight. These still bottoms have found no commercial use and are presently discarded as waste.

It has also been heretofore known to produce blocked isocyanates by reacting substantially pure organic polyisocyanates in some cases entirely with phenol-type compounds, and in other cases partly with triols and/or diols and partly with phenol-type compounds.

It is, therefore, an object of this invention to provide a chemical process in which distillation residues obtained in the production of polyisocyanates, which have been heretofore discarded, are used as an initial ingredient. It is another object of this invention to provide a blocked isocyanate. It is another object of this invention to provide a blocked isocyanate by a method which utilized the still bottoms obtained from the preparation of organic polyisocyanates by the phosgenation of the corresponding amines. It is still another object of this invention to provide a process for preparing a block isocyanate suitable for the production of coatings, wire enamels, caulking compounds and the like. It is a further object of this invention to provide a method of preparing blocked isocyanates from the still bottoms obtained in the production of organic isocyanates by phosgenating the corresponding organic amines, which blocked isocyanates will split when heated to elevated temperatures to liberate reactive isocyanate groups.

The foregoing objects and others which will become apparent from the following description are accomplished in accordance with the invention, generally speaking, by providing a method of recovering distillation residues obtained in making isocyanates wherein the residues obtained in the distillation of organic isocyanates prepared by the phosgenation of the corresponding amines are reacted with an organic compound having the formula:

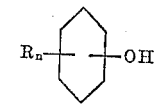

where R is either hydrogen, or lower alkyl and $n$ is an integer of 1 to 5. Moreover, this invention contemplates the preparation of a blocked isocyanate by reacting the distillation residues obtained in the preparation of organic isocyanates by the phosgenation of the corresponding organic amines with a compound in accordance with that set forth above by heating the mixture to a temperature of from about 100° C. to about 150° C. for several hours and then filtering off any solids which remain. The monohydroxyl benzene compound as represented by the above formula serves not only as a reactant with the free —NCO groups contained in the distillation residues, but also as a solvent for the blocked polymer.

When the distillation residues are heated with the monohydroxyl compounds the blocked isocyanates result. The fact that blocked isocyanates are present is evidenced by subsequent reaction between the blocked isocyanate and the other organic compounds containing active hydrogen containing groups as evidenced by the Zerewitinoff test; these reactions occur at temperatures of about 125° C. to 250° C. which cause isocyanate containing compounds to be split off from the blocked isocyanate and react with the active hydrogen containing groups of the organic compound.

The distillation residues obtained in the preparation of any organic isocyanate by the phosgenation of the corresponding amine may be used in the preparation of the blocked isocyanates in accordance with this invention such as, for example, the distillation residues obtained in the preparation of hexyl isocyanate from hexyl amine, cyclohexyl isocyanate from cyclohexyl amine, phenyl isocyanate from aniline, furfuryl isocyanate from furfuryl amine, tetramethylene diisocyanate from tetramethylene diamine, pentamethylene diisocyanate from pentamethylene diamine, hexamethylene diisocyanate from hexamethylene diamine, octamethylene diisocyanate from octamethylene diamine, undecamethylene diisocyanate from undecamethylene diamine, dodecamethylene diisocyanate from dodecamethylene diamine, 3,3'-diisocyanato dipropyl ether from 3,3'-diamino dipropyl ether, xylylene diisocyanates from xylylene diamines, diphenylmethane-4,4'-diisocyanate from 4,4'-diamino diphenylmethane, 2,2-diphenylpropane-4,4'-diisocyanate from 2,2-diphenylpropane-4,4'-diamine, p-isocyanato benzyl isocyanate from p-aminobenzyl amine, m-phenylene diisocyanate from m-phenylene diamine, p-phenylene diisocyanate from p-phenylene diamine, 2,4-tolylene diisocyanate from 2,4-tolylene diamine, 2,6-tolylene diisocyanate from 2,6-tolylene diamine, naphthylene-1,4-diisocyanate from naphthylene-1,4-diamine, naphthylene - 1,5 - diisocyanate from naphthylene-1,5-diamine, 1,3,5-benzene triisocyanate from 1,3,5-benzene triamine, 2,4,4'-triisocyanato diphenyl ether from 2,4,4'-triamino diphenyl ether, furfurylidene diisocyanate from furfurylidene diamine and the like. Although the distillation residues obtained in the preparation of any of these isocyanates may be utilized in the preparation of the blocked isocyanates of this invention, it is preferred that the distillation residues obtained in the preparation of aromatic diisocyanates from the corresponding amine by the phosgenation method be used.

Any monohydroxyl benzene compound having the formula:

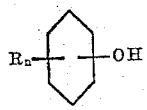

where R may be hydrogen or a lower alkyl branched or straight chain aliphatic radical having from 1 to 5 carbon atoms and $n$ is an integer of 1 to 5 may be used in the process of this invention to prepare a blocked isocyanate. Any compound fitting this general formula may be used such as, for example, phenol, o-, m-, and p-cresols, o-, m-, and p-ethyl phenol, o-, m-, and p-ethenyl phenol, o-, m-, and p-propyl phenol, o-, m-, and p-propenyl phenol, o-, m-, and p-isopropyl phenol, o-, m-, and p-butyl phenol, o-, m-, and p-isobutyl phenol, o-, m-, and p-tertiary butyl phenol, o-, m-, and p-amyl phenol, o-, m-, and p-isoamyl phenol, o-, m-, and p-tertiary amyl phenol; 2,3-xylenol, 3,4-xylenol, 2,6-xylenol, 2,4-xylenol, 3,5-xylenol, 2,5-xylenol; 2,3-diethyl phenol, 3,4-diethyl phenol, and 2,6-diethyl phenol; 2,4-diethyl phenol, 3,5-diethyl phenol, and 2,5-diethyl phenol; 2,3-dipropyl phenol, 3,4-dipropyl phenol, 2,6-dipropyl phenol, 2,4-dipropyl phenol, 3,5-dipropyl phenol and 2,5-dipropyl phenol; 2,3-diisopropyl phenol, 3,4-diisopropyl phenol, 2,6-diisopropyl phenol, 2,4-diisopropyl phenol, 3,5-diisopropyl phenol, and 2,5-diisopropyl phenol; 2,3-diisobutyl phenol, 3,4-diisobutyl phenol, 2,6-diisobutyl phenol, 2,4-diisobutyl phenol, 3,5-diisobutyl phenol, and 2,5-diisobutyl phenol; 2,3-dibutyl phenol, 3,4-dibutyl phenol, 2,6-dibutyl phenol, 2,4-dibutyl phenol, 3,5-dibutyl phenol and 2,5-dibutyl phenol; 2,3-di(tertiarybutyl) phenol, 3,4-di(tertiarybutyl) phenol, 2,6-di(tertiarybutyl) phenol, 2,4-di(tertiarybutyl) phenol, 3,5-di(tertiarybutyl) phenol, and 2,5-di(tertiarybutyl) phenol; 2-methyl-3-ethyl phenol, 2-methyl-6-ethyl phenol, 3-methyl-4-ethyl phenol, 2-methyl-4-ethyl phenol, 3-methyl-5-ethyl phenol, 2-methyl-5-ethyl phenol, 2-propyl-3-butyl phenol, 3-ethyl-5-isobutyl phenol, 3-ethenyl-4-propyl phenol and the like.

In the process in accordance with this invention, the distillation residues are dissolved in the monohydroxyl benzene compound. The distillation residues are either in the solid or molten form depending upon the temperature at which they are introduced into the monohydroxyl benzene compound. The melting point of the distillation residues is generally between about 170° C. and 230° C. If the distillation residues are utilized immediately after removal from the still and in the molten state, it is generally preferred that they be added to a larger quantity of the monohydroxyl benzene compound since these compounds in some instances have boiling points below the molten temperature of the distillation residues and, therefore, it is impractical to add the monohydroxyl benzene compounds to the molten residues. This order of addition is not essential, however, and either order may be used. That is, the molten residues may be added to the monohydroxyl benzene compound or the monohydroxyl benzene compound may be added to the molten residues. In the latter case, care must be taken that the boiling temperature of the solution does not exceed the boiling point of the monohydroxyl benzene compound. If solid distillation residues are utilized in the process of this invention, it is generally preferred to grind them into small particles which are then dissolved in the monohydroxyl benzene compound. This can be accomplished by first grinding the residues in a solid grinding machine such as a hammer mill and then introducing the particles into the monohydroxyl benzene compound or by grinding the distillation residues after they have been introduced into the monohydroxyl benzene compound by utilizing equipment such as a ball mill. In either procedure, the temperature of the solution rises gradually as reaction occurs between the —NCO groups remaining in the distillation residues and the hydroxyl groups of the monohydroxyl benzene compound. This solution is then heated to a temperature of from about 100° C. to about 150° C. for a period of time of from about 1 to about 6 hours. The resulting solution is then filtered to remove any solid particles that remain. The resulting clear dark solution contains a blocked isocyanate in the monohydroxyl benzene compound which also serves as a solvent therefor. The resulting solution will vary from a very viscous liquid having a viscosity greater than 100,000 centipoises to a liquid having a viscosity of about 200 centipoises. Of course, the viscosity is directly related to the excess of the monohydroxyl benzene compound used. If a great excess is used, the viscosity decreases as well as percentage of available —NCO. That is, as more monohydroxyl compound is utilized in the reaction with the distillation residues, the viscosity decreases, and the available —NCO also decreases.

The blocked isocyanates prepared in accordance with this invention are particularly suitable in reaction with materials such as, hydroxyl polyesters and polyhydric polyalkylene ethers for the preparation of coatings and wire enamels. Any suitable hydroxyl polyester may be used such as those prepared by the reaction of a polyhydric alcohol with a polycarboxylic acid. Any suitable polyhydric alcohol may be used such as, ethylene glycol, propylene glycol, butylene glycol, xylylene glycol, amylene glycol, trimethylol propane, glycerine, diethylene glycol, triethylene glycol, 1,3,6-hexane triol, pentaerythritol, sorbitol and the like. Any suitable polycarboxylic acid may be used such as, for example, adipic acid, methyladipic acid, succinic acid, oxalic acid, glutaric acid, pimelic acid, sebacic acid, azelaic acid, suberic acid, phthalic acid, terephthalic acid, 1,2,4-tricarboxylic acid, thiodiglycollic acid, thiodipropionic acid, maleic acid, fumaric acid, itaconic acid, citraconic acid and the like.

Any suitable polyhydric polyalkylene ether may be used such as, for example, the condensation product of an alkylene oxide with a small amount of compound containing active hydrogen containing groups such as, for example, water, ethylene glycol, propylene glycol, butylene glycol, amylene glycol, trimethylol propane, glycerine, pentaerythritol, hexane triol and the like. Any suitable alkylene oxide condensate may be used such as, for example, ethylene oxide, propylene oxide, butylene oxide, amylene oxide or mixtures thereof. The polyhydric polyalkylene ether may be prepared by any known process such as, for example, the process described by Wurtz in 1859 and in "Encyclopedia of Chemical Technology," volume 1, pages 257 to 262, published by Interscience Publishers, Inc., 1951 or in U.S. Patent 1,922,459.

Wire enamels and coatings prepared utilizing the blocked isocyanates of this invention are prepared by admixing the blocked isocyanate with the polyester, applying the mixture to a substrate and then baking the substrate at a temperature of from about 125° C. to about 250° C. for from about 15 minutes to about 2 hours. The temperature range specified is required in order to regenerate free —NCO groups by splitting the urethane linkage established in the reaction of the monohydroxyl benzene compound with the distillation residues.

The blocked isocyanates in accordance with this invention may also be reacted with materials such as coal tar pitches obtained as residues in the distillation of coal tar which is a by-product in the manufacture of coke from bituminous coal. The blocked isocyanates may be admixed with the pitch and applied to substrates where they are baked causing the liberation of —NCO terminated compounds which react with the pitch causing a hard, flexible black coating to result. These coatings are especially suitable as undercoatings in the automobile industry.

The blocked isocyanates prepared in accordance with this invention may also be utilized advantageously by mixing with polyamide resins, which are prepared by the condensation of dimerized fatty acids such as dimerized linoleic acid with lower aliphatic polyamines such as, ethylene diamine, or diethylene triamine in such a manner that the final product contains available primary and secondary amine groups. Polyamide resins as prepared by the process disclosed in U.S. Patent 2,450,940 are suitable for reacting with the blocked isocyanates of this invention. These coating compositions obtained by this combination of ingredients are also first applied to a substrate and then heated to split off the monohydroxyl benzene compound, leaving the isocyanate groups which react with the amine groups of the polyamide to form coating compositions.

Of course, in the preparation of coating compositions suitable pigments may be used in the formulation such as, for example, iron oxide, titanium oxide, carbon black and the like. Further, fillers may also be incorporated such as, for example, sawdust, paper, cellulose, textile fabrics, crushed stone, asbestos or finely defined silica.

The invention is further illustrated by the following examples in which parts are given by weight unless otherwise specified.

Example 1

About 280 g. of the solid distillation residues obtained in the preparation of tolylene diisocyanate by the phosgenation of tolylene diamine are admixed with about 860 g. of cresylic acid which is a crude mixture of o-, m- and p-cresols. A heat rise is noted which indicates a reaction between the —NCO groups contained in the distillation residues with the hydroxyl groups of the cresol. The temperature of the mixture is then raised to about 135° C. and maintained at this temperature with stirring for a period of about 2 hours. The solution is then cooled to room temperature and the viscous solution is filtered to remove undissolved particles. The resulting product is a heavy viscous blocked isocyanate in cresylic acid having 1.4% available —NCO.

Example 2

The blocked isocyanate in solution as obtained in Example 1 prior to the filtration thereof is diluted with an equal amount of cresylic acid in order to reduce the viscosity and thereby aid filtration. The resulting clear dark filtrate has 0.7% of —NCO which corresponds to 5.75% of the original weight of tolylene diisocyanate distillation residues reactive as available —NCO.

Example 3

To about 280 g. of a molten distillation residue obtained in the preparation of tolylene diisocyanate by the phosgenation of tolylene diamine is gradually added to about 1500 g. a mixture of xylenols and cresols. The melting point of the molten residues is about 180° C. After the entire amount of residues is incorporated into the mixture of xylenols and cresols, the entire solution is maintained at a temperature of about 140° C. for about 3 hours. The resulting product is a blocked isocyanate in a xylenol-cresol solution.

Example 4

About 100 parts of a polyester prepared by reacting 0.5 mols of phthalic anhydride, 2.5 mols of adipic acid and 4 mols of glycerine and having an acid number of about 2 are admixed with about 2400 parts of the blocked isocyanate prepared in accordance with Example 1. The resulting solutions are applied to a metallic substrate and stoved at a temperature of about 175° C. for about one-half hour. The resulting coating is a hard dark-brown film.

Example 5

To about 100 parts of pitch obtained as a by-product in the preparation of coke and commonly referred to in the trade as coal-tar pitch is added about 70 parts of the blocked isocyanate prepared in accordance with the procedure set forth in Example 1. The resulting solution is applied to a substrate and baked at about 155° C. for about 1 hour. The hard black coating composition suitable for use as undercoatings in the automobile industry results.

Example 6

To about 220 parts of a polyamide resin prepared by condensing dimerized linoleic acid and diethylene triamine to a product having an equivalent weight value of from about 210 to about 230 based on the amine content and a viscosity at 40° C. of about 500 to about 750 poises (Brookfield Viscometer=No. 6 spindle, 4 r.p.m.) is added about 4500 parts of the blocked polyisocyanate solution prepared in accordance with the procedure of Example 1. The resulting solution is sprayed on panels and baked for one-half hour at 205° C. A dark hard film is obtained which exhibits resistance to chemicals and solvents.

Of course, any distillation residues obtained in the phosgenation of any of the organic amines as set forth above may be utilized in the process of this reaction to produce blocked isocyanates. Further any of the compounds represented by the generic formula set forth above may be utilized in the examples to prepare blocked isocyanates in accordance with this invention.

Although the invention has been described in considerable detail for the purpose of illustration, it is to be understood that variations may be made therein by those skilled in the art without departing from the spirit of the invention and the scope of the claims.

What is claimed is:

1. In a process for the preparation of a blocked isocyanate which comprises phosgenating an aromatic amine to form a crude isocyanate reaction mix, distilling substantially all the monomeric isocaynate from said reaction mix, leaving remaining thereby a residue material, the improved method of recovering from said residue material blocked isocyanates which comprises reacting said residue with an excess of an aromatic phenol having the formula:

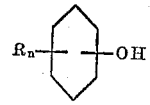

wherein R is a member selected from the group consisting of hydrogen and lower alkyl and $n$ is an integer having a value of from 1 to 5.

2. The process of claim 1 wherein R is H.

3. The process of claim 1 wherein R is a lower alkyl radical.

4. The process of claim 1 wherein said aromatic phenol is reacted with said residue at a temperature of from about 100° C. to about 150° C.

5. The process of claim 1 wherein a further excess of said phenol is added to said residue and wherein unreacted solid material resulting therefrom is filtered out.

References Cited in the file of this patent

UNITED STATES PATENTS

| | | |
|---|---|---|
| 2,733,261 | Seeger et al. | Jan. 31, 1956 |
| 2,797,232 | Bunge | June 25, 1957 |
| 2,865,940 | Nobis et al. | Dec. 23, 1958 |
| 2,921,872 | McGlamery | Jan. 19, 1960 |
| 2,950,997 | Halacay | Aug. 30, 1960 |